Jan. 27, 1942.                L. P. YOUNG                 2,271,325
                         HEAT-CHOKE SOLDERING IRON
                           Filed March 11, 1940
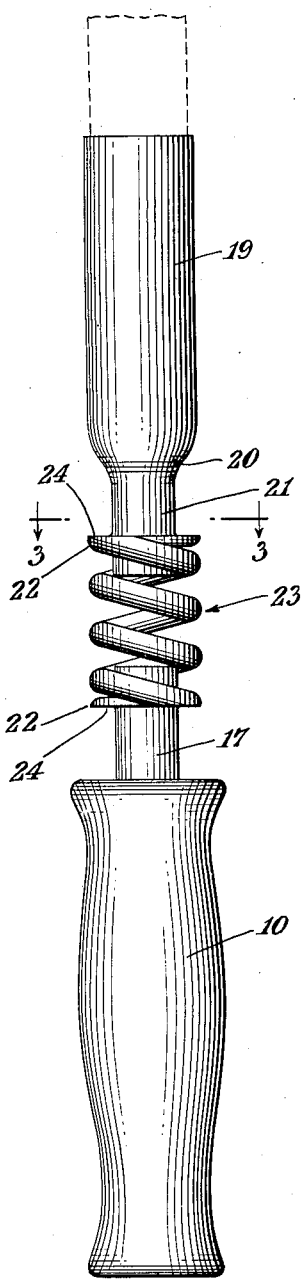
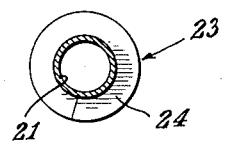
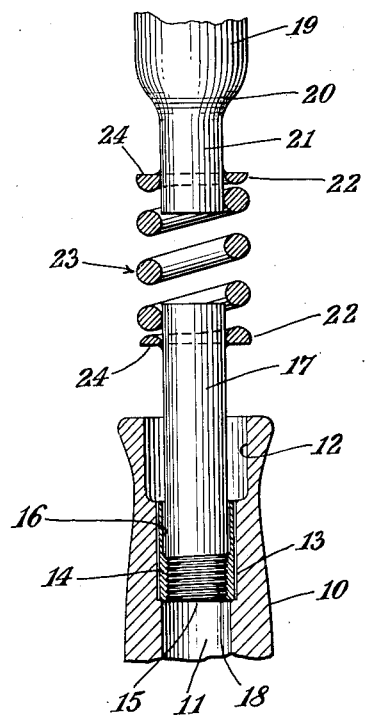
INVENTOR,
Leonard P. Young.
BY
his Attorney.

Patented Jan. 27, 1942

2,271,325

UNITED STATES PATENT OFFICE 2,271,325

HEAT-CHOKE SOLDERING IRON

Leonard P. Young, Chester, Conn.

Application March 11, 1940, Serial No. 323,359

2 Claims. (Cl. 113—105)

This invention relates generally to electric soldering irons, and particularly to what may be called heat-gapped or heat-choked electric soldering irons.

When an electric soldering iron is continuously in use, experience has shown that that portion of the iron containing the heating unit will transmit its heat to the handle portion of the iron to such an extent that it often becomes difficult or even impossible to continue work with the device, unless it is permitted to cool off.

The present invention contemplates the construction of an electric soldering iron wherein the heat transfer from the heating unit to the handle portion is greatly minimized or even entirely prevented by the employment of what may be termed a heat choke interposed between the heating unit and the handle. In order to provide the desired effects, it is essential that the construction of the different parts of the iron, as well as of the heat choke, be designed accordingly.

The prime object of this invention is to provide an electric soldering iron structure consisting of two aligned, spaced structure parts, each of which parts will in itself provide for sufficient heat dissipation to minimize the transfer of heat from one part to the other, and wherein these parts are rigidly spaced and as rigidly connected by means of an open helix, the material of which is of sufficient strength and stiffness to prevent the movement of one structure part relative to the other.

Another object of this invention is to provide a heat choke for connecting and gapping two parts of an electric soldering iron structure, which heat choke is in the form of a spiral having generously spaced convolutions providing for air circulation in between them, and which spiral is provided with attaching ends consisting of at least one complete convolution, which latter is compressed to form a circle, and wherein the circle forming ends are flattened and exteriorly faced.

The foregoing and still further important objects and other advantages of the present invention will become more fully apparent from the ensuing description and the accompanying drawing, in which latter Figure 1 illustrates an electric soldering iron structure provided with a heat choke in accordance with my invention.

Figure 2 is a partial detail view showing a vertical cross section through the heat choke and through the handle portion of the device, and Figure 3 is a transverse cross sectional view taken on lines 3—3 of Figure 1.

Referring now specifically to the figures, numeral 10 denotes the handle of an electric soldering iron, which is preferably hollow as indicated at 11, and which is provided with a large end recess 12 and a smaller adjacent recess 13. Into recess 13 there is pressed a fluted nipple 14, the interior lower end of which is internally threaded at 15, while its other portion is recessed at 16. Extending into nipple 14 is a tubular element 17 which is spaced from the wall of recess 16 and engages with its externally threaded portion 18 threads 15 at the end of the nipple. It will be seen that element 17 is spaced not only from the recessed nipple wall, but also, and to a greater extent, from the wall of recess 12 provided in the handle.

Handle 10 and tubular element 17 constitute the handle portion of the soldering iron structure. Aligned with this handle portion, but spaced therefrom, is a heating unit receiving portion consisting of a relatively long, hollow cylindrical formation 19, having a sufficiently large interior diameter for accommodating an electric heating unit. Cylinder 19 is reduced at 20 and terminates in an extension 21 which is of a considerably lesser diameter than cylinder 19. The diameter of extension 21 corresponds to the diameter of tubular element 17. It will be observed that extension 21 and tubular element 17 are aligned with one another and are spaced for a considerable distance.

Permanently and fixedly secured to the ends of extension 21 and tubular element 17 are the compressed ends 22 of an open helix or spiral 23. The attached ends of the spiral constitute at least one full convolution of the helix and form complete circles or rings which engage the ends of tubular elements 17 and 21. The outer ends of the ring-shaped formations of the spiral are flattened and faced, as shown at 24.

It is to be noted that the attached spiral ends are generously distanced from the bodies of cylinder 19 and handle 10. This distancing from the two bodies not only provides for heat dissipation, but is particularly important for element 17, in that it effectively prevents an accidental or inadvertent contact of the operator's hand with coil 23. Flattened face 24 of the spiral ends may be advantageously coated with a heat reflecting or heat insulating substance, such as aluminum and a refractory material, respectively, or both. Obviously, the inner diameters of the ring-shaped, attached ends of the spiral correspond to the outer diameters of extension 21 and tubular member 17, to provide accurate fit.

The convolutions of the spiral between the compressed, attached ends are generously spaced from one another to provide for ample air circulation between them. Particular attention is directed to the manner in which the spiral ends are secured to the very ends of tubular elements 17 and 21. It is contemplated that the joint between the spiral and these elements are welded or brazed so as to prevent any relative movement between the spaced and aligned parts of the iron. The material of the spiral is of a sufficiently heavy construction to form a stiff, unyielding connection between the handle and heating unit portions, whereby vibration or "give" is positively prevented.

In observing the large body of cylinder 19 and its sharply reduced extension element 21, it will become evident that that construction is provided on purpose. The large body of the cylinder is intended to quickly radiate heat and dissipate the same, while the reduced extension 21 is intended to limit the transfer of heat to the minimum. Similarly recess 12 in handle 10 and off-set 16 in nipple 14 serve the specific purpose of minimizing or preventing heat radiation from element 17 to the handle, in the event that some of the heat from cylinder 19 should not be completely dissipated by radiation and choked by spiral 23.

Since the purpose of this invention is directed towards the main result of preventing or at least substantially minimizing the transmission of heat from cylinder 19 to the handle, the entire structure of the iron, aside of the interposition of the spiral between the two tubular members, is designed to dissipate heat from those parts of the iron which do not need to be heated, or where heat is objectionable. To achieve this purpose I have reduced the contact areas between the spiral ends and the tubular members to a minimum, without weakening the joints or impairing the stiffness and rigidity of the whole structure; for the same reason I have made extension 21 and tubular member 17 relatively long in order to increase the heat-radiating areas of these elements; and, finally, I have endeavored to separate tubular member 17 from the handle over almost its entire length, and provide, for that portion of the member which extends into the handle, a surrounding, heat-insulating layer of air.

A noteworthy practical feature of the present invention may be found in the dimensioning of the spiral. From the drawing it will be seen that the outer diameter of the spiral does not exceed, but rather approximates the outer diameter of cylinder body 19, whereby the major portion of the iron may be uniformly supported over practically its entire length.

While the foregoing description deals with but one embodiment of my invention, it is quite obvious that changes and improvements may become necessary in the course of producing the device on a large scale, and I therefore reserve for myself the right to make such changes and improvements therein without departing from the broad scope of my invention as defined in the annexed claims.

I claim:

1. In an electric soldering iron construction, a handle, a receptacle for a heating unit having a materially reduced tubular extension, a tubular member, having a threaded attaching end, extending from the handle and being aligned with and spaced from said extension, the diameters of said extension and of said tubular member being substantially equal, a stiff, open cylindrically shaped spiral structure permanently connecting the spaced ends of said extension and of said tubular member, so that a substantial portion of these tubular elements remain free of said spiral structure, the ends of the spiral structure forming closed ring-shaped convolutions with flattened exterior faces which latter are substantially spaced from said handle body and from the body of the receptacle.

2. In an electric soldering iron construction, a hollow handle, provided at one end with an inner, relatively small, and an adjoining outer, substantially larger recess, a fluted, internally threaded nipple lodged in the inner recess, a receptacle for a heating unit having a materially reduced tubular extension, a tubular member, having a threaded attaching end, engaging the thread and being spaced from the body of the nipple, and extending from the handle and being aligned with and spaced from said extension, the diameters of said extension and of said tubular member being substantially equal, a stiff, open, cylindrically shaped spiral structure permanently connecting the spaced ends of said extension and of said tubular member, so that substantial portions of these two tubular elements are free of the spiral structure, the ends of the latter forming closed ring-shaped convolutions with flattened exterior faces which latter are substantially spaced from the bodies of said handle and of the receptacle.

LEONARD P. YOUNG.